(12) United States Patent
Nowoczin et al.

(10) Patent No.: US 8,438,804 B2
(45) Date of Patent: May 14, 2013

(54) WALL LEADTHROUGH FOR LEADING A LINE THROUGH A BUILDING WALL

(75) Inventors: Andreas Nowoczin, Dorsten (DE); Gerd-Rüdiger Klose, Dorsten (DE)

(73) Assignee: Deutsche Rockwoll Mineralwoll GmbH & Co. OHG (DE)

( * ) Notice: Subject to any disclaimer, the term of this patent is extended or adjusted under 35 U.S.C. 154(b) by 422 days.

(21) Appl. No.: 12/374,985

(22) PCT Filed: Jul. 21, 2007

(86) PCT No.: PCT/EP2007/006496
§ 371 (c)(1),
(2), (4) Date: Jun. 11, 2009

(87) PCT Pub. No.: WO2008/012037
PCT Pub. Date: Jan. 31, 2008

(65) Prior Publication Data
US 2009/0320392 A1 Dec. 31, 2009

(30) Foreign Application Priority Data
Jul. 25, 2006 (DE) .................... 20 2006 011 374 U

(51) Int. Cl.
*E04F 17/00* (2006.01)
(52) U.S. Cl.
USPC ........................................ 52/220.8; 52/407.5
(58) Field of Classification Search ............... 52/220.8, 52/407.5, 220.3, 220.1, 219, 232, 405.1
See application file for complete search history.

(56) References Cited

U.S. PATENT DOCUMENTS

| | | | |
|---|---|---|---|
| 438,507 A | 10/1890 | Tracey | |
| 1,895,420 A | 1/1933 | Mottweller | |
| 2,706,495 A * | 4/1955 | Risley | 138/148 |
| 3,574,027 A * | 4/1971 | Bonnet | 156/191 |
| 3,616,516 A * | 11/1971 | Corriston | 29/402.18 |
| 3,864,909 A | 2/1975 | Kern et al. | |
| 3,877,491 A * | 4/1975 | Thastrup | 138/149 |
| 4,086,736 A * | 5/1978 | Landrigan | 52/220.8 |
| 4,109,423 A * | 8/1978 | Perrain | 52/1 |
| 4,124,040 A * | 11/1978 | Miller | 138/148 |
| 4,363,199 A * | 12/1982 | Kucheria et al. | 52/220.8 |
| 4,424,867 A * | 1/1984 | Mallow | 169/43 |

(Continued)

FOREIGN PATENT DOCUMENTS

| | | |
|---|---|---|
| DE | 27 26 241 | 6/1977 |
| DE | 3737416 A1 | 5/1989 |

(Continued)

*Primary Examiner* — William Gilbert
*Assistant Examiner* — James Ference
(74) *Attorney, Agent, or Firm* — Harness, Dickey & Pierce, P.L.C.

(57) ABSTRACT

The present invention relates to a wall passage opening for passing a conduit through a through-penetration defining at least one reveal, of a building with a substantially vertical or horizontal orientation, wherein the conduit is covered with an insulation material (10) comprising an insulation shell (16), at least in the region of the passage opening, the diameter of the insulation element substantially corresponding to the inner diameter of the passage opening, wherein the insulation shell (16) includes a cavity for accommodating a conduit section (22) having an enlarged outer diameter and wherein the insulation shell (16) is made of mineral fibers, to accommodate the conduit section (22) having the enlarged outer diameter in a quick and easy manner.

19 Claims, 11 Drawing Sheets

U.S. PATENT DOCUMENTS

Figure 1A:
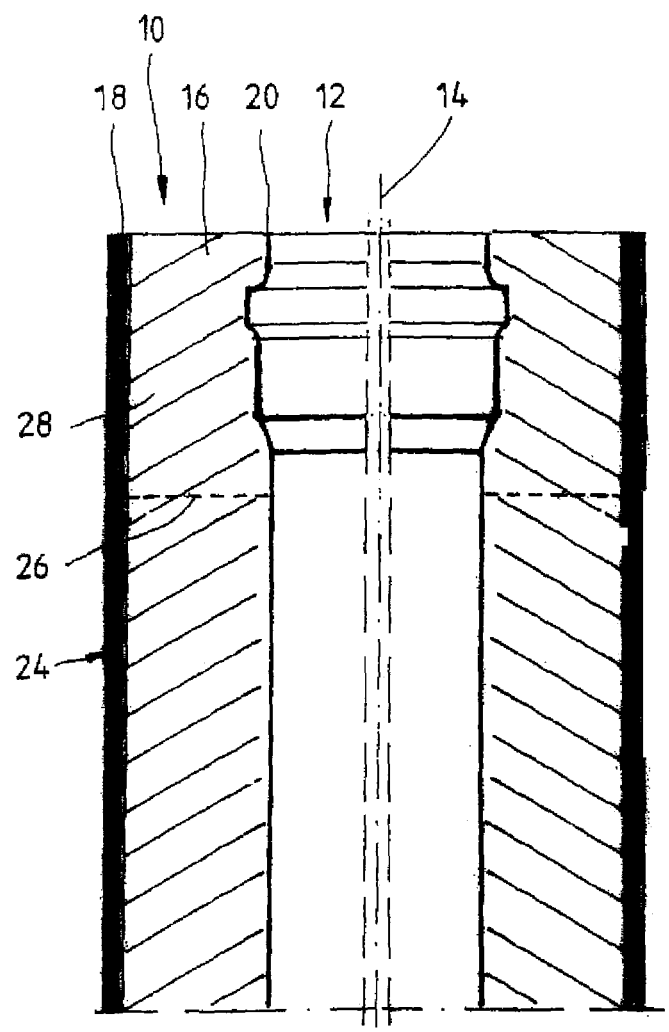

| | | | |
|---|---|---|---|
| 4,509,561 A | | 4/1985 | Litz |
| 4,538,389 A | * | 9/1985 | Heinen .......................... 52/220.8 |
| 4,587,082 A | * | 5/1986 | Schoening et al. ............ 376/291 |
| 4,607,469 A | * | 8/1986 | Harrison ....................... 52/220.8 |
| 4,669,759 A | * | 6/1987 | Harbeke ........................ 285/136.1 |
| 4,751,031 A | * | 6/1988 | Baars ............................. 264/35 |
| 4,800,926 A | * | 1/1989 | Beck .............................. 138/106 |
| 4,807,669 A | | 2/1989 | Prestidge, Sr. et al. |
| 4,848,043 A | * | 7/1989 | Harbeke ........................ 52/1 |
| 4,850,385 A | * | 7/1989 | Harbeke ........................ 137/75 |
| 4,888,925 A | * | 12/1989 | Harbeke ........................ 52/232 |
| 4,916,800 A | * | 4/1990 | Harbeke ........................ 29/469 |
| 4,918,761 A | * | 4/1990 | Harbeke ........................ 4/252.4 |
| 5,017,314 A | | 5/1991 | Zemanek et al. |
| 5,058,346 A | * | 10/1991 | Spaeth ........................... 52/317 |
| 5,105,592 A | * | 4/1992 | MacMillan et al. ........... 52/232 |
| 5,174,077 A | * | 12/1992 | Murota .......................... 52/232 |
| 5,347,767 A | * | 9/1994 | Roth ............................... 52/1 |
| 5,351,448 A | * | 10/1994 | Gohlke et al. ................. 52/1 |
| 5,390,465 A | * | 2/1995 | Rajecki ......................... 52/741.3 |
| 5,452,551 A | * | 9/1995 | Charland et al. .............. 52/232 |
| 5,456,050 A | * | 10/1995 | Ward ............................. 52/220.8 |
| 5,548,934 A | | 8/1996 | Israelson ....................... 52/220.8 |
| 5,725,331 A | * | 3/1998 | Martinez ....................... 405/303 |
| 5,826,886 A | * | 10/1998 | Hauff et al. ................... 277/314 |
| 5,851,330 A | * | 12/1998 | Cridland et al. .............. 156/229 |
| 5,971,444 A | * | 10/1999 | Hawkins ........................ 285/206 |
| 6,305,133 B1 | * | 10/2001 | Cornwall ....................... 52/232 |
| 6,336,297 B1 | * | 1/2002 | Cornwall ....................... 52/232 |
| 6,341,626 B1 | * | 1/2002 | Davenport et al. ............ 138/110 |
| 6,349,975 B1 | * | 2/2002 | Heil ................................ 285/64 |
| 6,405,502 B1 | * | 6/2002 | Cornwall ....................... 52/220.8 |
| 6,470,635 B2 | * | 10/2002 | Cornwall ....................... 52/220.8 |
| 6,495,753 B1 | * | 12/2002 | Goodsell et al. .............. 174/483 |
| 6,530,187 B2 | * | 3/2003 | Shimizu ......................... 52/220.1 |
| 6,550,819 B2 | * | 4/2003 | DeSanto, Sr. .................. 285/192 |
| 6,789,275 B2 | * | 9/2004 | Spells et al. ................... 4/252.5 |
| 6,810,568 B1 | * | 11/2004 | LaCoste ......................... 29/402.08 |
| 6,862,852 B1 | * | 3/2005 | Beele ............................. 52/220.8 |
| 7,082,730 B2 | * | 8/2006 | Monden et al. ................ 52/232 |
| 7,159,620 B2 | * | 1/2007 | Kissell ........................... 138/149 |
| 2001/0001355 A1 | * | 5/2001 | Shimizu ......................... 52/220.1 |
| 2002/0032996 A1 | * | 3/2002 | Cornwall ....................... 52/220.8 |

FOREIGN PATENT DOCUMENTS

| | | |
|---|---|---|
| DE | 3819229 A1 | 12/1989 |
| DE | 92 04 217 | 3/1992 |
| DE | 298 04 351 | 3/1998 |
| DE | 199 05 103 | 8/2000 |
| DE | 20103110 U1 | 8/2001 |
| EP | 1035375 A | 9/2000 |
| EP | 1522800 A | 4/2005 |
| WO | WO-2005046016 A | 5/2005 |
| WO | WO-2005108843 A | 11/2005 |

* cited by examiner

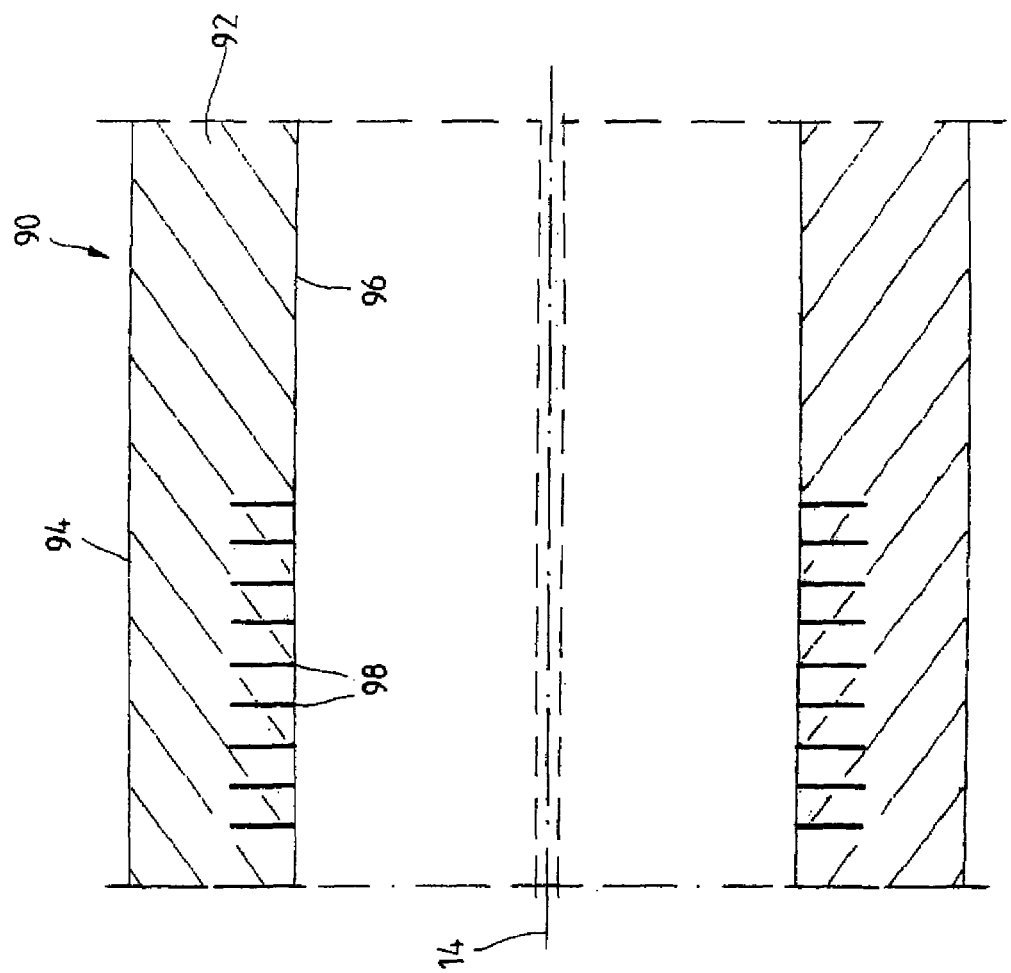

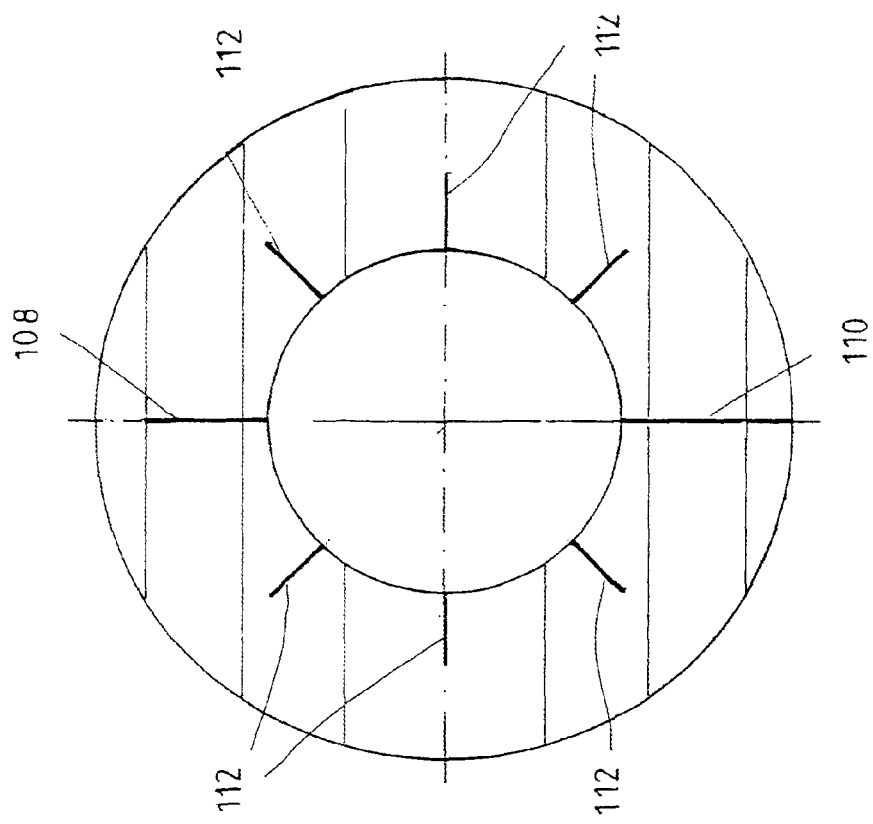
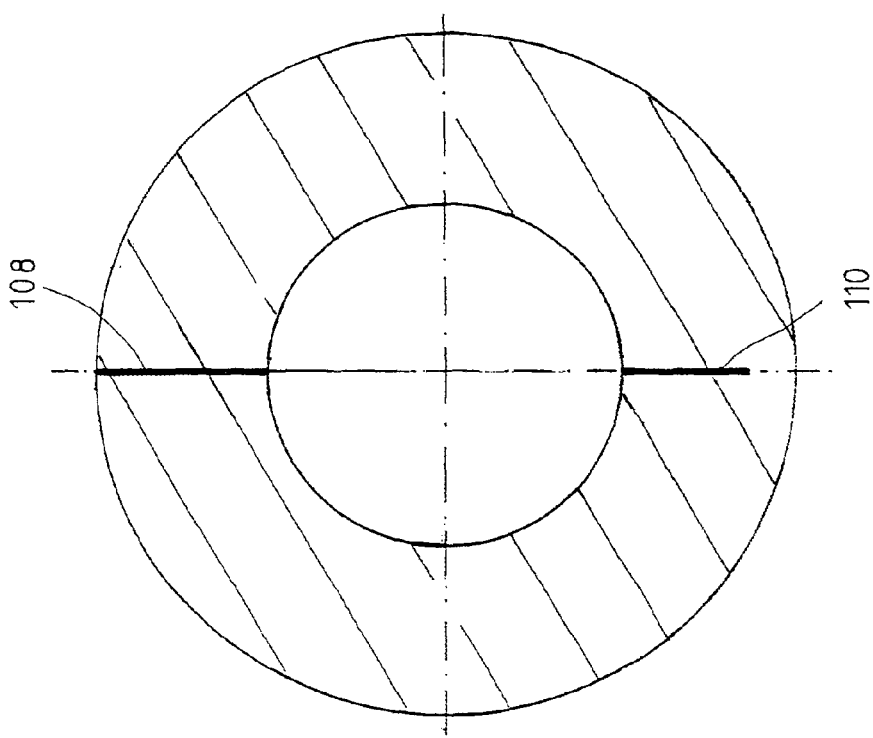

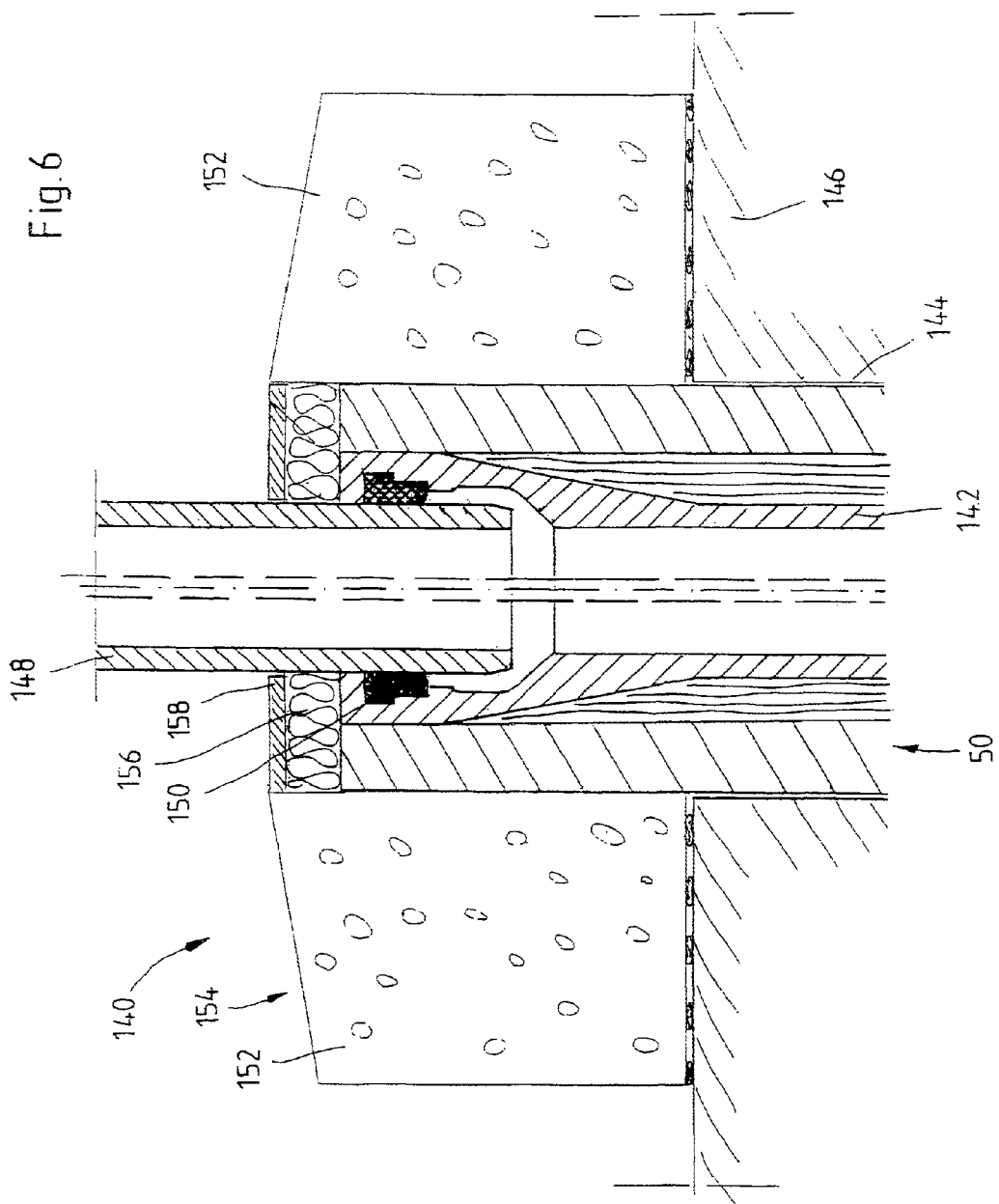

WALL LEADTHROUGH FOR LEADING A LINE THROUGH A BUILDING WALL

The present invention relates to a wall passage opening for passing a conduit through a through-penetration of a building wall defining at least one reveal. The conduit can be a pipeline or an energy and/or information conductor in the form of a cable or the like.

In prior art there are already known various wall passage openings of the above-mentioned kind which are designed as so-called closure and sealing devices preventing spreads of smoke and/or fire through the wall passage opening. Document DE 199 05 103 A1 for example discloses a device for the sealing enclosure of trains of pipes and/or ducts in an opening in a wall and/or ceiling or floor. This device consists of a sleeve which surrounds the train of pipes and/or ducts and which is heat and smoke-resistant at the impact of fire. The sleeve is designed as a pipe shell made of mineral fibers, and the pipe shell is flexible in the axial and radial directions and is inserted in a closure and sealing device closing the opening in the wall and/or ceiling or floor and adjoining the outer surface area of the sleeve. Such a device has delivered optimal performance in practice for the purposes described in this document. On the other hand, it turned out to be time-consuming and costly to seal the area between the pipe shell and the reveal in the region of the opening. This frequently requires complicated building work which comprises more than one working stage and cannot be accomplished alone by the worker laying the cables. Accordingly, this results in two different craft activities being performed at different times within the structure. By performing these different craft activities at different times, the pipe shell may become damaged and is repaired afterwards with reasonable care.

Further, DE 298 04 351 U1 discloses a device for sealing a pipe. This pre-known device includes a layer of heat-resistant material and at least one soundproofing layer surrounding the pipe. This layer is a layer of artificial resin-bound rock wool which is arranged in a mortar fill within the opening of the structure. Even in this device two different craft activities are required for installing these two layers, so that this device also suffers from the above-mentioned shortcomings.

Another closure and sealing device is known from document DE 92 04 217 U1. This type of closure and sealing device for a through-penetration provided in a fire-protecting partition wall for at least one element penetrating through the wall, preferably a cable route, is comprised of a fire-retarding element, preferably a mineral fiber board, including at least one through-penetration for the element penetrating through the wall. In this known closing and sealing device the fire-retarding element is reinforced in the perimeter region of the element penetrating through the wall. Accordingly, this device suffers from the disadvantage that the part between the reinforced region and the wall is relatively weakly constructed, so that possible damages during mounting the closure and sealing device are spared from attention resulting in that the required sealing against smoke is not given in a later case of fire.

Furthermore, document DE 27 26 241 A1 discloses a fireproof cable and pipe through-penetration made of a non-combustible, bound mineral fiber, e.g. rock wool. A cable box is provided which is covered with mineral fibers on both sides. This design suffers from the drawback that even here a number of different craft activities are required which have to be performed by different craftsmen.

Document DE 201 03 110 U1 describes a closure and sealing device for a building wall, in a substantially vertical or horizontal orientation and comprising at least one through-penetration forming a reveal for passing at least one energy and/or information conduit penetrating through the wall. At least in the region of the through-penetration said conduit is covered with a sleeve which is designed as a pipe shell made of mineral fibers. The sleeve substantially directly adjoins the reveal of the through-penetration that is formed as a bore, and closes and seals the through penetration in a completely heat-resistant and smoke-tight fashion in the radial and axial directions.

The above-described wall passage openings especially lend themselves to receive conduits having a constant outer diameter. But frequently also enlarged outer diameter sections of conduits, for example connectors or pipe couplings, are arranged in the region of the wall through-penetration. Providing such conduit sections having an enlarged outer diameter in the region of the wall through-penetration requires a great deal of manual work for making ordinary pipe shells suitable for accommodating the enlarged outer diameter conduit section. Alternatively, the regions which are intended to receive the enlarged outer diameter sections must be stuffed with loose wool stuffing.

Accordingly, the present invention is based on the object of providing a wall passage opening of the above-described kind that can accommodate enlarged outer diameter conduit sections and that is quickly and easy to install.

The wall passage opening according to the present invention serves to pass a conduit through a through-penetration forming at least one reveal in a building wall with a substantially vertical or horizontal orientation. The conduit can be a pipeline or an energy and/or information conductor or the like. At least in the region of the through-penetration the conduit is covered with an insulation element comprising an insulation shell with an outer diameter which substantially corresponds to the inner diameter of the through-penetration.

In accordance with the invention the insulation shell comprises a cavity for accommodating a conduit section having an enlarged outer diameter, such as a socket end of a socket pipe, a separate connector for connecting pipes, a valve or the like. The enlarged outer diameter conduit section can easily be arranged in this insulation shell, without requiring time-consuming and costly manual insulation work.

Preferably, the reveal of the through-penetration is covered with a refractory layer, for example with a mortar layer. Thus the reveal can be formed very uniformly, so that the insulation element together with the conduit contained therein can be easily installed in the reveal.

The insulation element preferably has an outer diameter which is slightly larger than the diameter of the through-penetration, so that the insulation element is positively and/or frictionally held within the through-penetration. Here it is especially the frictional connection that offers the advantage that the required sealing between the reveal and the insulation element can be achieved already as a result of the frictional forces occurring in this region.

The insulation element is preferably applied against the conduit, so that additional sealing means need not be provided in this region either. It can be advantageous in some cases to connect the insulation element to the conduit by means of an elastic bond.

The front face of at least one free end of the insulation element and the front face of the conduit arranged inside the insulation element are preferably covered with an insulation disk which is preferably designed in such a manner that it can be swung open for easy installation. The insulation disk in turn is covered with a rigid molded part which is preferably impregnated so as to be easy to spread. Thus a smoke and fire-resistant closure of the wall passage opening on the front face can be obtained.

The length of the insulation element can substantially correspond to the length of the through-penetration. Thus it is possible to obtain a surface on both sides of the wall passage opening which is flush with the wall of the structure. However, the insulation element can also have a greater length than the through-penetration, so that a part of the insulation element protrudes from the through-penetration at least on one side. Around this protruding part of the insulation element molded parts are advantageously arranged which surround this part of the insulation element so as to be flush with it. The molded parts preferably consist of a stable, incombustible material, for example concrete, porous concrete, sintered glass, foam glass or the like, so that the molded parts protect the protruding part of the insulation element together with the conduit supported therein against damages from outside. For fixing the molded parts the same can be bonded to each other and/or to the wall of the structure. The bond can be designed refractory and smoke-tight, so that a sealing of the wall passage opening is obtained by the molded parts.

According to a first variant of the insulation element, an inner contour of the insulation shell section intended to receive the enlarged outer diameter conduit section substantially corresponds to the outer contour of the conduit section intended to be received and substantially positively fits against the outer contour of the conduit section received in the cavity. Here the diameter regions of the inner contour of the insulation shell section receiving the conduit section preferably are slightly smaller than the corresponding outer diameter regions of the outer contour of the conduit section, so that a contact pressure improving the insulating effect is produced between the inner contour of the insulation shell section and the outer contour of the conduit section received therein. The inner contour of the insulation shell section can be produced for example by a machining process.

The bulk density of the insulation material preferably amounts to at least 80 kg/m$^3$, so that the insulation material is relatively rigid but yet flexible. The insulation material further includes organic binders at a content of at least 1% of dry mass in relation to the insulation material.

The contents of organic thermosetting resins preferably are between 0.8% by weight and 1.2% by weight. Thus the insulation shell becomes softer and can be pressed more tightly against the surface of the object to be insulated. If brittle inorganic binders are used, such as organically modified silanes for example, their percentage is adjusted to the respective bulk density to generate insulation materials which are rigid on one side but have sufficiently flexible surfaces on the other side.

The perimeter of the insulation shell is preferably surrounded by a single or multilayered protective layer. The protective layer can include for example metal foils having the function of a water-steam barrier. It can also include plastic films to protect the outside of the insulation element against attacks of alkalis which are effective in wet adhesives or wet mortars. Glass fiber cloth lathing or the like can serve as a reinforcement to protect the insulation element form external mechanical influences.

According to a further variant of the insulation element, at least in the insulation shell section intended to accommodate the conduit section having the enlarged outer diameter, an insulation material section is designed so as to be flexible to such an extent that this insulation material section fits to and is applied under a contact pressure against an outer contour of the conduit section arranged in the cavity of the insulation shell. In contrary to the above-described variant, the inner contour of the insulation shell section accommodating the conduit section having the enlarged outer diameter is thus not pre-molded to fit the outer contour of the conduit section, but the insulation material section of the insulation shell is made elastic to such an extent that its inner contour will fit to the outer contour of the conduit section only at the time of installing a conduit section. Thus a force-fit and substantially form-fit reception of the conduit section is produced. Also this variant provides for a time-saving and inexpensive insulation of a conduit section having an enlarged outer diameter.

To increase the flexibility of the insulation material section of the insulation shell which when it is used as intended surrounds the conduit section, this insulation material section can be kneaded to decrease its stiffness.

Further the insulation material section preferably includes mineral fibers which substantially are oriented so as to run parallel to the longitudinal axis of the conduit section that is accommodated as intended. This improves the deformability in the axial direction of the insulation material section, so that the same can better adapt to the conduit section to be accommodated.

Additionally or alternatively the said insulation material section can include at least one radially extending incision. Making concentric slits or other recesses in the inner wall of the insulation material section of the insulation shell accommodating the enlarged outer diameter conduit section also increases the flexibility. Here the maximum width of the slits or recesses preferably is 3 mm, even more preferably 1.5 mm to 2 mm. The spacing of the slits or recesses depends on the outer contour of the conduit section. Abrupt changes of the cross section require the slits or recesses to be positioned closer to each other and more deeply than in the case of gradual transitions. By making incisions or slits, the mostly annular segments thus formed can independently react to the kind and extent of the deformation, so that finally a form-fit connection with the object to be insulated is obtained at least for the most part. If necessary the flexibility of the insulation material is still increased by pinching or kneading this section in the radial direction preferably after making the slits, thus decreasing the stiffness and increasing the flexibility of the insulation material as already described above.

Further the insulation material section of the insulation shell accommodating the enlarged outer diameter conduit section can be composed of several annular segments which are juxtaposed in the axial direction which may have a different inner diameter. The bulk densities, the binders of the individual segments and hence their rigidity can be differently high. The individual segments can be previously kneaded. To obtain a safe connection to the free end of a pipeline section at least the final segment should have the outer diameter of this section.

The insulation shell is preferably arranged in a cavity of an outer protective shell comprising an insulation material. The outer circumference of the protective shell in turn can be surrounded with a single or multilayered protective layer as already described above. Preferably, the insulation material consists of mineral fibers bound with binders, particularly rock wool.

The insulation material of the outer protective shell preferably contains higher organic binder contents than the insulation material of the insulation shell accommodating the conduit section having the enlarged outer diameter, whereby the outer protective shell is given a higher rigidity than the insulation shell. For the same reason the insulation material of the outer protective shell preferably also has a higher bulk density than the insulation shell. The mineral fibers of the outer protective shell are preferably arranged in the radial direction of the insulation element, thus improving the rigidity in this direction and accordingly the protection of the insulation shell against external mechanical influences.

To prevent gaps between the outer protective shell and the insulation shell accommodating the enlarged outer diameter conduit section from opening and thus allowing smoke gases to pass through, the protective shell and the insulation shell are preferably fixed to each other. The fixing is preferably effected by means of an adhesive, preferably a filled inorganic adhesive, for example based on water glass. The adhesive can be applied to the entire surface or annularly, for instance in concentric rings at axially spaced positions. Gluing the protective shell to the insulation shell naturally facilitates placing the insulation element accurately around the object to be insulated.

Advantageously, either the outer protective shell protrudes over the insulation shell accommodating the conduit section in the axial direction of the conduit section to be accommodated, or the insulation shell protrudes over the outer protective shell in the axial direction of the conduit section to be accommodated, to form a kind of labyrinth seal with an appropriately designed connection element.

Finally, the insulation shell accommodating the conduit section and/or the outer protective shell is preferably arranged for being opened, thus allowing the insulation element to be slipped over the conduit section transversely to its axial direction. For this purpose the shell or shells constituting the insulation element can be cut open on one side and incised on the opposite side, so that the insulation element can be swung open in the direction of the incised side. Alternatively, the insulation element of course can be designed also in a multi-part fashion, for instance in a two-part fashion.

Figure 1B:
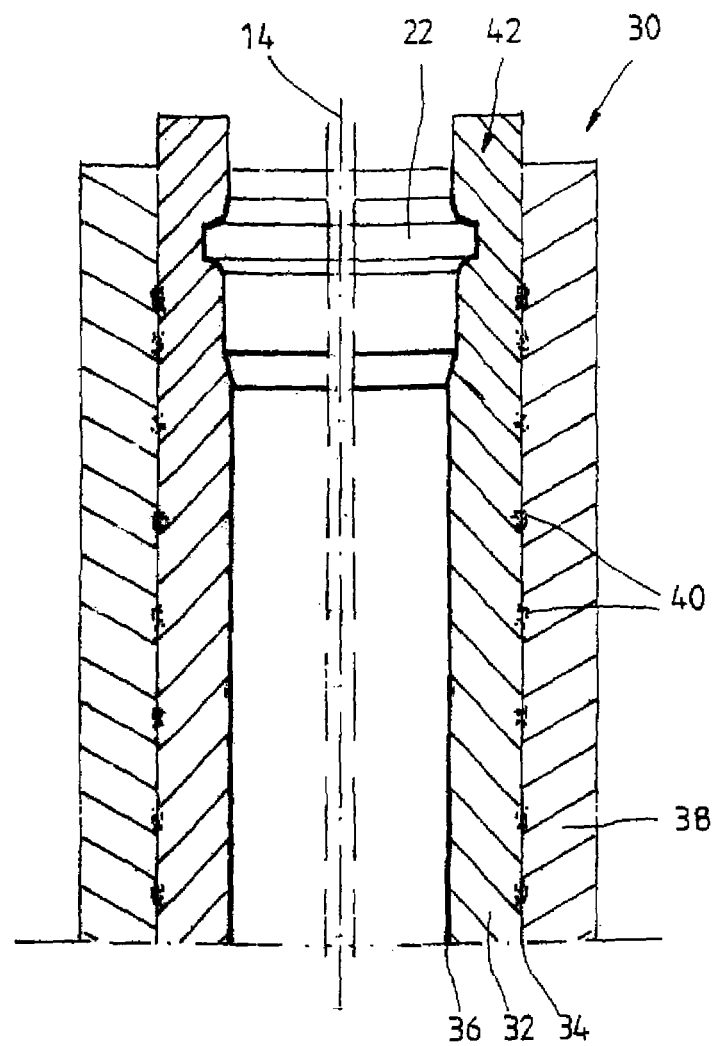
Figure 2A:
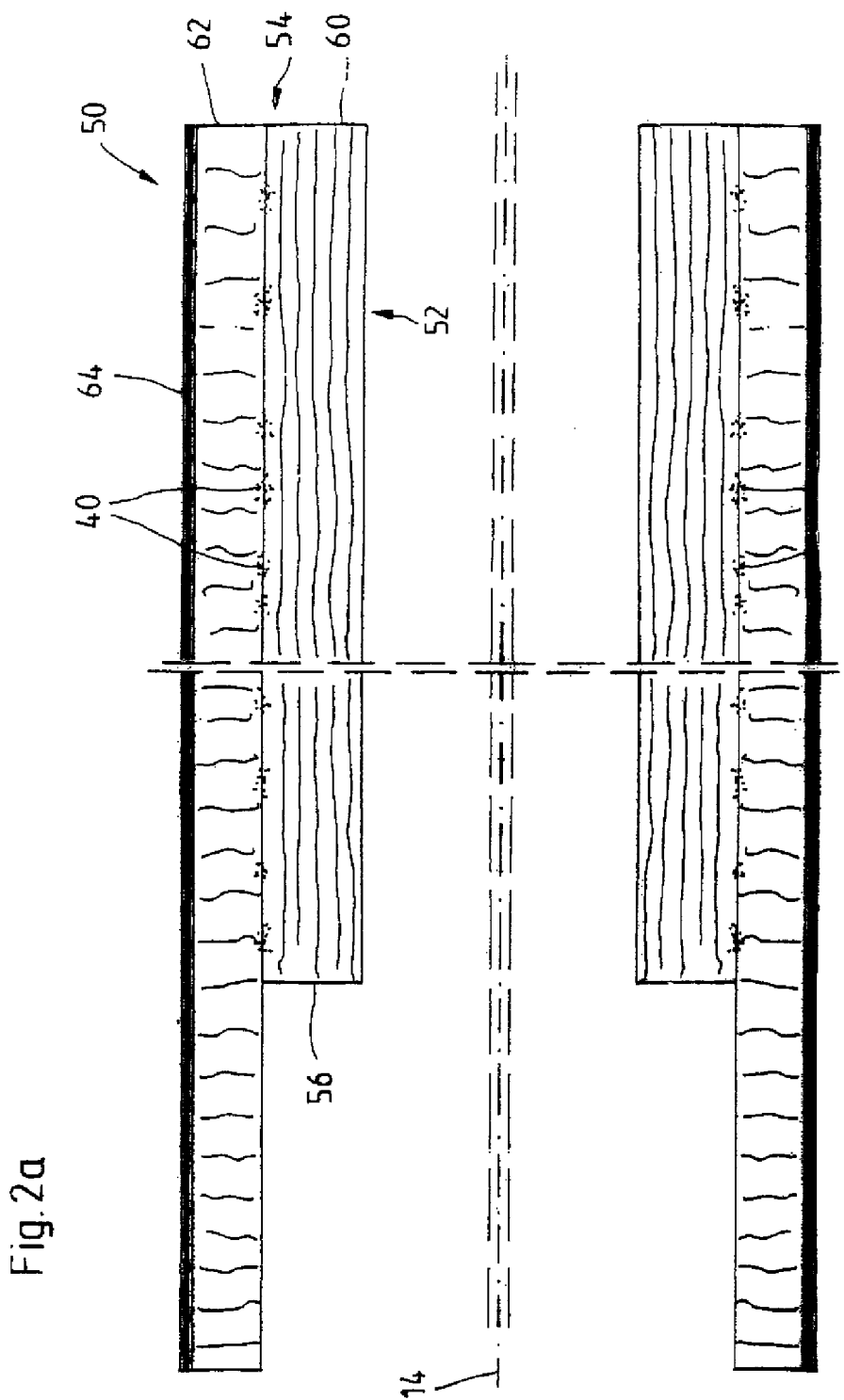
Figure 2B:
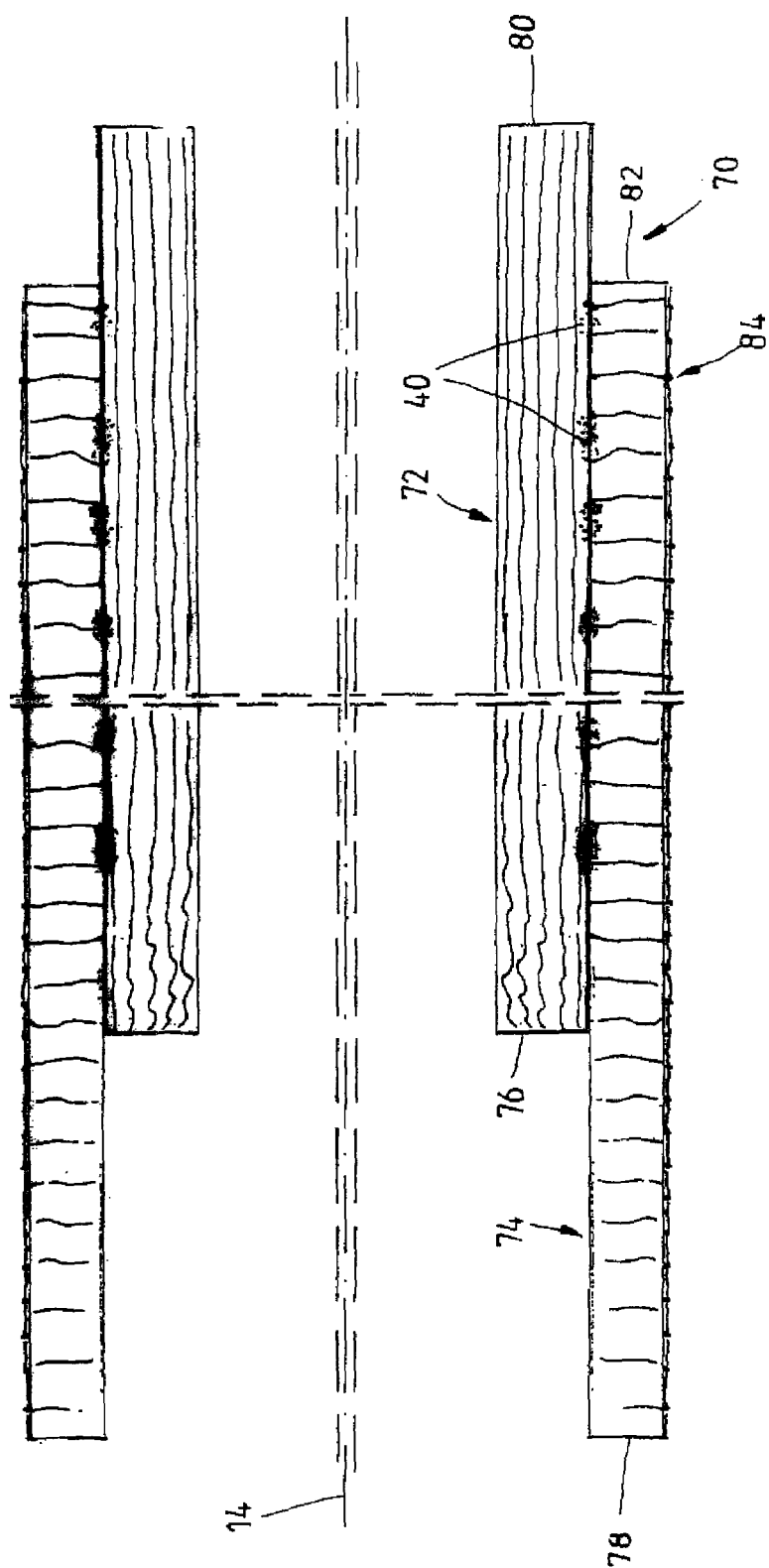
Figure 3B:
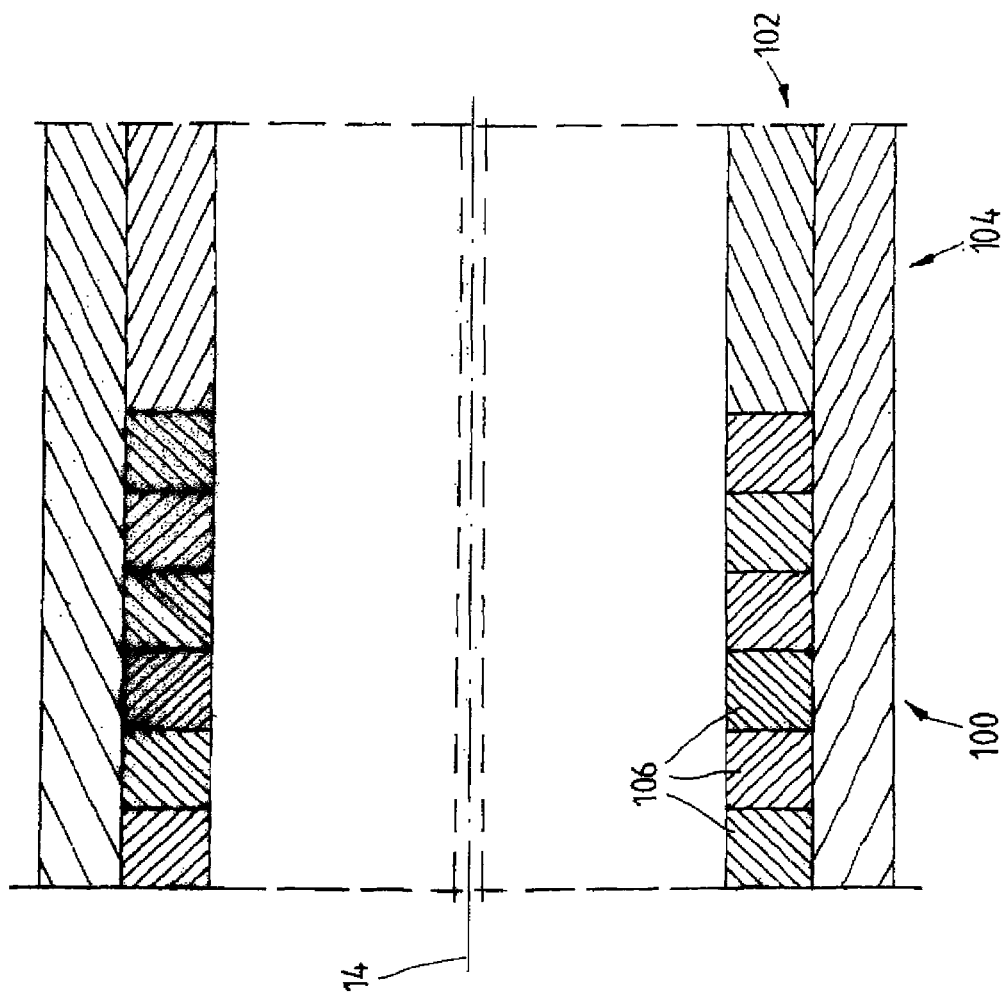
Figure 5A:
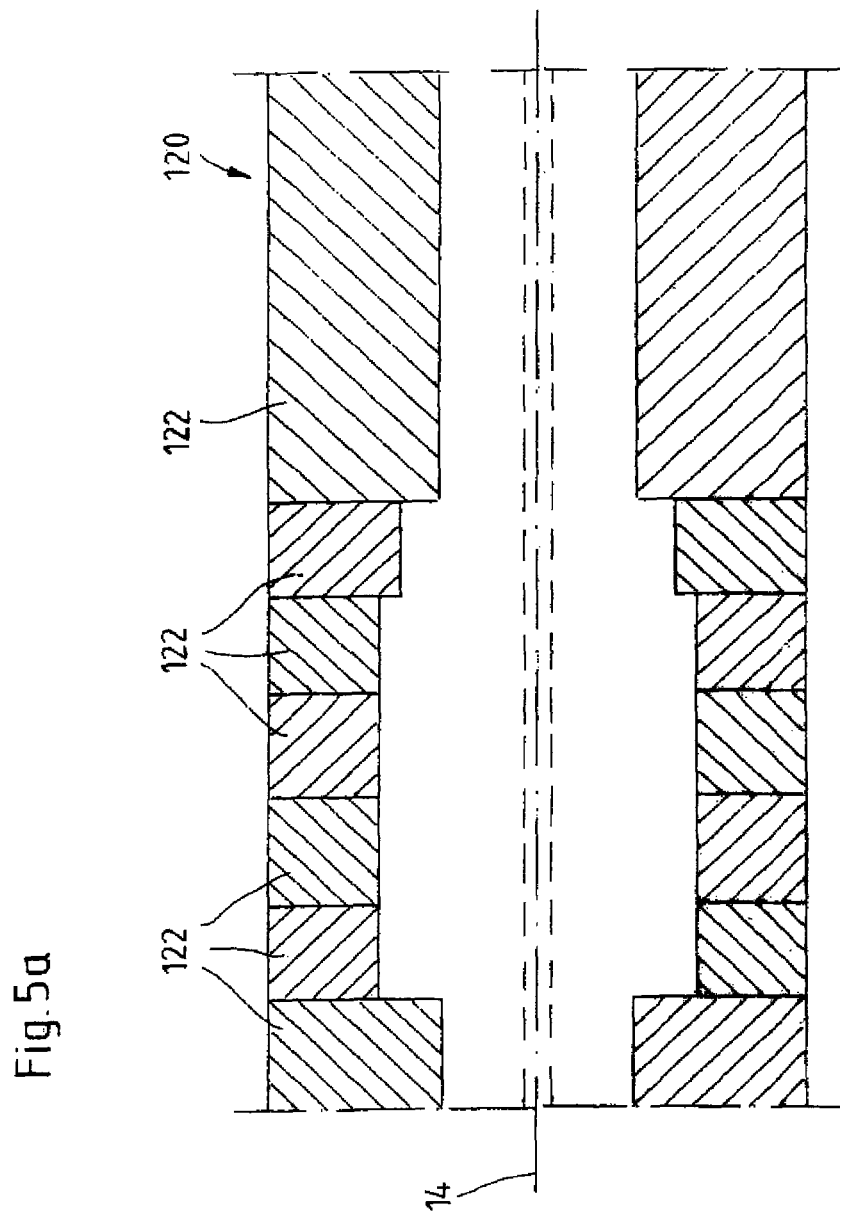
Figure 5B:
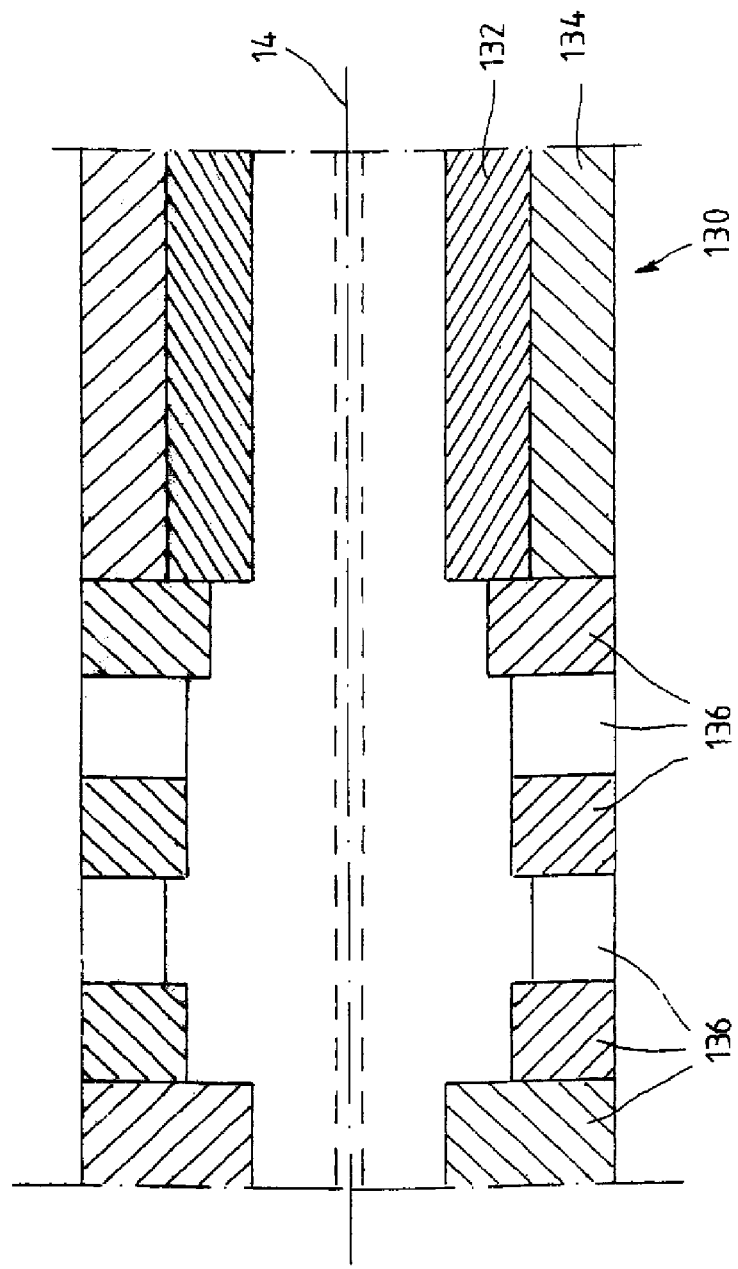
Figure 7:
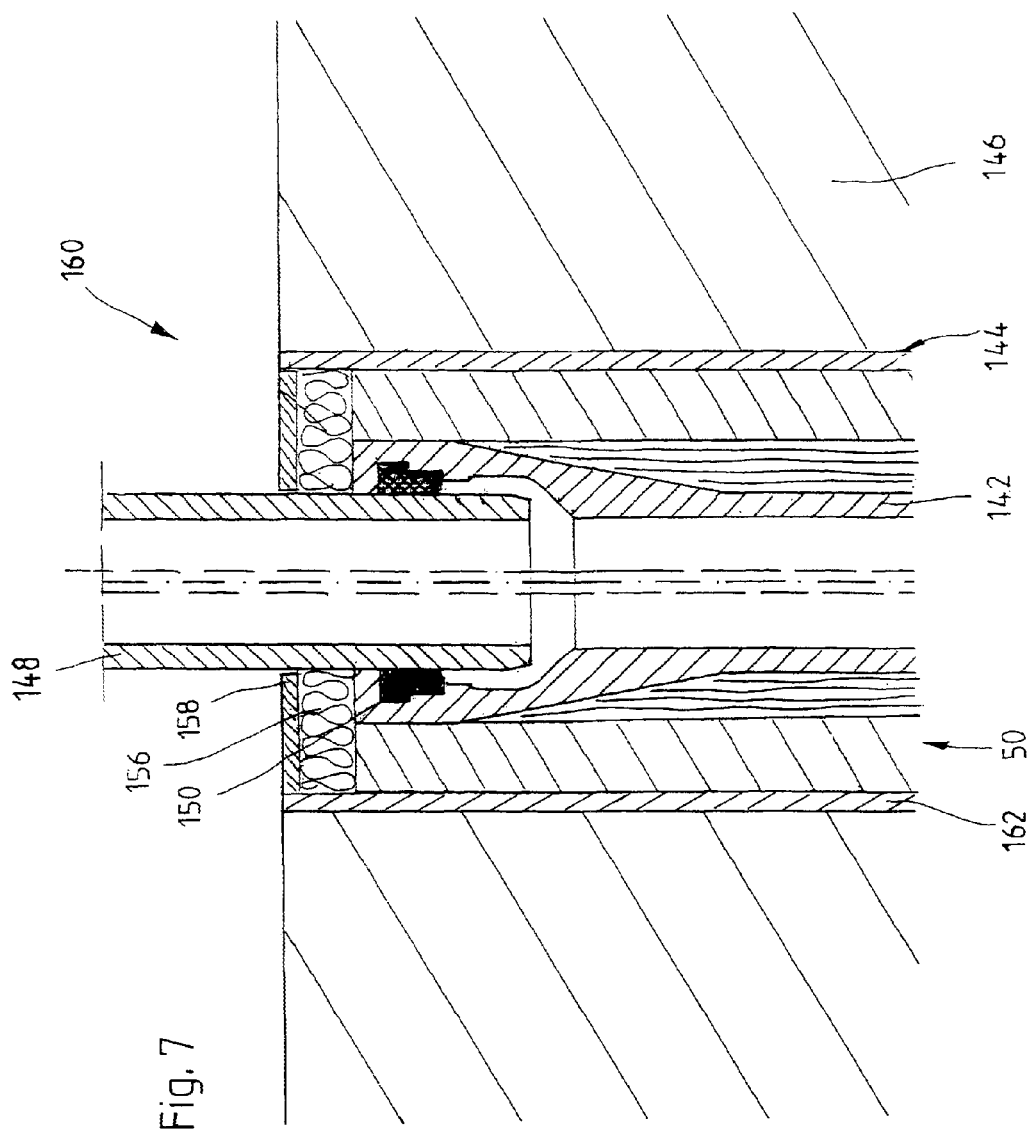

In the following the invention will be described in more detail with reference to the attached drawing wherein it is shown by FIG. 1a a longitudinal sectional view of a first embodiment of an insulation element with a socket pipe received therein, for forming a wall passage opening according to the invention;

FIG. 1b a longitudinal sectional view of a second embodiment of an insulation element with a socket pipe received therein, for forming a wall passage opening according to the invention;

FIG. 2a a longitudinal sectional view of a first embodiment of a second variant of an insulation element without a socket pipe, for forming a wall passage opening according to the invention;

FIG. 2b a longitudinal sectional view of a second embodiment of a second variant of an insulation element without a socket pipe, for forming a wall passage opening according to the invention;

FIG. 3a a longitudinal sectional view of a third embodiment of a second variant of an insulation element without a socket pipe, for forming a wall passage opening according to the invention;

FIG. 3b a longitudinal sectional view of a fourth embodiment of a second variant of an insulation element without a socket pipe, for forming a wall passage opening according to the invention;

FIG. 4a a cross sectional view of an insulation element for forming a wall passage opening according to the invention;

FIG. 4b a cross sectional view of an alternative insulation element for forming a wall passage opening according to the invention;

FIG. 5a a longitudinal sectional view of a fifth embodiment of a second variant of an insulation element without a socket pipe, for forming a wall passage opening according to the invention;

FIG. 5b a longitudinal sectional view of an alternative embodiment of a second variant of an insulation element without a socket pipe, for forming a wall passage opening according to the invention;

FIG. 6 a sectional view of a first embodiment of a wall passage opening according to the invention and FIG. 7 a sectional view of a second embodiment of a wall passage opening according to the invention.

Similar components are identified by the same reference numbers.

FIG. 1a is a longitudinal sectional view illustrating a first embodiment of a first variant of an insulation element 10 according to the invention. The insulation element can be opened and is adapted for the insertion of a standard socket pipe 12. The structure of each of the insulation element 10 and the socket pipe 12 is rotationally symmetrical, so that for reasons of simplicity FIG. 1a merely illustrates the half to the left of the axis of symmetry 14.

The insulation element 10 comprises a hollow cylindrical insulation shell 16 having a cylindrical outer surface 18 and a substantially cylindrical inner surface 20, said inner surface defining a cavity for accommodating the socket pipe 12. In the insulation shell section accommodating a socket end 22 of the socket pipe 12, the inner surface 20 of the insulation shell 16 is textured in such a way that it can be pressed against the socket end in a form-fit fashion while observing the admissible tolerance limits of the socket pipe 12 to be insulated. In the present embodiment, the socket end 22 represents the conduit section having the enlarged outer diameter. The texturing of the inner surface 20 of the insulation shell 16 is made by appropriately removing excess material, for instance by applying a machining process. The minimum bulk density of the insulation material forming the insulation shell 16 is 80 kg/m$^3$. The content of organic binders, e.g. the usual mixtures of phenolic, formaldehyde, urea resins amounts to at least 1% of dry mass in relation to the insulation material. The outer surface 18 of the insulation shell 16 is provided with an affixed multilayered film-like protective layer 24, for example with a five-layered protective layer which can be comprised from the inside to the outside of layers of PE film, metal foil, PE film and glass fiber cloth lathing, metal foil, PE film. Here the metal foil especially has the effect of a water-steam barrier. The PE films provide protection against the attacks of alkalis which are effective in the wet adhesives or wet mortars. The glass fiber cloth lathing embedded in the PE layer normally serves to the reinforcement of the sheath for protection against external mechanical influences. The metal foils predominantly consist preferably of aluminum.

As an alternative a short molded piece 28 is indicated in FIG. 1a by means of the broken line 26. This short molded piece merely covers the direct section of the insulation shell 16 surrounding the socket end 22 of the socket pipe 12.

FIG. 1b is a longitudinal sectional view of a further embodiment of the first variant of an insulation element 30 according to the invention, which has inserted therein a standard socket pipe 12. The insulation element 30 and the socket pipe 12 each have a rotationally symmetrical structure, so that for reasons of simplicity FIG. 1b merely illustrates the half to the right of the axis of symmetry 14.

The insulation element 30 comprises an inner hollow cylindrical insulation shell 32 having a cylindrical outer surface 34 and a substantially cylindrical inner surface 36. In the section of the insulation shell which accommodates the socket end 22 of the socket pipe, the inner surface 36 is textured in such a way that a form-fit connection is established between the inner surface 36 and the outer contour of the socket end 22 while observing the tolerance limits of the socket pipe 12 to be insulated. Around the outer surface 34 of the inner insulation shell 32 a hollow cylindrical outer protective shell 38 is arranged. The outer surface 34 of the insulation shell 32 and the inner surface of the outer protective shell 38 contact each other and are preferably connected to each other by means of a filled inorganic adhesive which is based for example on water glass. The adhesive can be applied to the entire surface. But according to FIG. 1b, the adhesive is partially applied annularly and in concentric rings. This is indicated by the adhesive bonds 40. The bonding of the insulation shell 32 and the outer protective shell 38 naturally facilitates the accurate placement of the insulation element 30 around the socket pipe 12.

The outer protective shell 38 primarily serves to the mechanic protection of the insulation shell 32 and for this reason can have a higher bulk density and in particular also higher contents of inorganic binders and other additives. In a way similar to that shown in FIG. 1a, the outer protective shell 38 of the insulation element 30 can be protected by sheet metal or film covers which are affixed or spread. Furthermore, cloths made of glass fibers or synthetic fibers such as carbon fibers or aramide fibers which can be impregnated with intumescent masses if necessary can be connected to the insulation shell 32 and/or the protective shell 38.

The insulation shell 32 can have a bulk density deviating from that of the outer protective shell 38. Preferably, the same is equal to or smaller than that of the outer protective shell 38, provided that the content of inorganic binders is lower at least by approx 30-50%. The contents of thermosetting resins can be reduced to approx 0.8 to 1.2% by weight. The insulation material of the insulation shell 32 thus becomes softer and can be more tightly pressed against the surface of the socket pipe 12. If brittle inorganic binders are used, for instance organically modified silanes, their percentages are adjusted to the respective bulk density to generate insulation materials which are rigid but still flexible on one side and have sufficiently adaptable surfaces on the other side.

The insulation shell 32 accommodating the socket pipe 12 can protrude over the outer protective shell 38 in the axial direction of the socket pipe 12 to be accommodated, as indicated by the protruding part 42 of the insulation shell 32. Thus a kind of labyrinth seal can be formed with an appropriately designed connection element. Alternatively, a part of the outer protective shell 38 can of course axially protrude over the insulation shell 32.

The insulation shell 32 and the outer protective shell 38 as well as the socket pipe 12 can simply be placed into one another. Since at higher bulk densities and continuing higher temperatures the usually employed mixtures from phenolic, formaldehyde and urea resins are subject to oxidation reactions with a corresponding release of energy, the outer protective shell 38 which is anyway exposed to the fire attack can sinter more strongly than the inner shell. Here the adhesive bonds 40 prevent gaps between the outer surface 34 of the insulation shell 32 and the inner surface of the outer protective shall 38 from opening.

FIG. 2a is a longitudinal sectional view of a first embodiment of a second variant of an insulation element 50 according to the invention intended for accommodating socket pipes having a simple geometrical shape. The insulation element 50 has a rotationally symmetrical structure, for which reason and for reasons of simplicity FIG. 2a merely illustrates one half up to the axis of symmetry 14. The insulation element 50 comprises a hollow cylindrical inner insulation shell 52 including insulation material, and a hollow cylindrical outer protective shell 54 including insulation material. The area forming the outer circumference of the insulation shell 52 and the area forming the inner circumference of the outer protective shell 54 are connected to each other by means of adhesive bonds 40. The adhesive bonds 40 are provided in an annular fashion and are axially spaced from each other. The adhesive which is used preferably is an inorganic adhesive. The insulation shell 52 has a shorter length than the outer protective shell 54, so that a free end 56 of the insulation shell 52 retreats with respect to the corresponding free end 58 of the outer protective shell 54 thus creating a space for accommodating a socket end. The free end 56 of the insulation shell, which serves as a transition from the pipe to the socket end of the socket pipe, can optionally be straight, as illustrated in FIG. 2a, or a slightly chamfered. In contrast, the other free ends 60 and 62 of the insulation shell 52 and the outer protective shell 54 terminate flush with each other.

The insulation materials of the insulation shell 52 and of the outer protective shell 54 can correspond to those of the corresponding inner shell 32 and of the corresponding outer protective shell 38 of the embodiment illustrated in FIG. 1b, the bulk density of the insulation material of the outer protective shell 54 without non-fibrous matter preferably being greater than 80 kg/m$^3$.

The outer protective shell 54 can be provided with a protective layer 64 which in the present case has a three-layered structure comprising from the outside to the inside a polyethylene film, an aluminum foil and again a polyethylene film. Of course, the protective layer 64 may optionally have a different structure.

Further illustrated in FIG. 2a is the orientation of the mineral fibers forming the insulation shell 52 and the outer protective shell 54. The mineral fibers of the insulation shell 52 substantially extend in the longitudinal direction of the insulation element 50, hence along the socket pipe to be accommodated or to the socket end to be accommodated, thus improving the deformability of the insulation shell 52 and consequently the application of the insulation shell 52 against the outer contour of the pipeline section. On the other hand, the mineral fibers of the outer protective shell 54 extend substantially radially, hence transversely to the socket pipe or the socket end to be accommodated, thus providing an increased stability of the outer protective shell 54 in the radial direction and a good protection against external influences.

FIG. 2b is a longitudinal sectional view of a further embodiment of insulation element 70 according to the invention. The insulation element 70 comprises a hollow cylindrical inner insulation shell 72 including an insulation material and intended for accommodating a socket pipe, and a hollow cylindrical outer protective shell 74 including an insulation material. Similar to the embodiments shown in the FIGS. 1b and 2a, the insulation shell 72 and the outer protective shell 74 are fixed to each other by means of bonding connections 40. A free end 76 of the insulation shell 72 facing the socket end is arranged so as to be retreating with respect to a free end 78 of the outer protective shell 74, thus forming a free space of accommodating the socket end. The free end 76 of the insulation shell 72, which is arranged in the transition zone from the pipe to the socket end of the socket pipe, has been strongly pressed or squeezed, i.e. kneaded, which clearly decreased the rigidity. The free end 76 of the insulation shell is no longer glued to the outer protective shell 74, resulting in that the insulation shell 72 can be pressed against the enlarged part of the socket end in a form-fit fashion. The other free end 80 of the insulation shell 72 protrudes over the corresponding free end 82 of the outer protective shell 74 to form a kind of labyrinth seal with an appropriately designed connection element.

The outer surface of the outer protective shell 74 is provided with an impregnation 84, for instance a silicate adhesive, silicate dispersion systems, adhesive mortar or the like, to achieve a force-fit interconnection with the embedding mortar in the region of wall passage openings. This impregnation 84 can be reinforced by glass fiber cloth lathing or random glass fiber webs.

FIG. 2b also indicates the orientation of the mineral fibers 72 forming the insulation shell 72 and the outer protective shell 74. The mineral fibers of the insulation shell 72 substantially extend in the longitudinal direction of the insulation element 70, hence along the socket pipe or the socket end to be accommodated, thus improving the deformability of the insulation shell 72 and consequently the application of the insulation shell 72 against the outer contour of the pipeline section. On the other hand, the mineral fibers of the outer protective shell 74 extend substantially radially, hence transversely to the socket pipe or the socket end to be accommodated, thus providing an increased stability of the outer protective shell 74 in the radial direction and a good protection against external influences.

FIG. 3 shows a longitudinal section of a further embodiment of an insulation element 90 according to the invention, which has a rotationally symmetrical structure, for which reason and for reasons of simplicity FIG. 3a merely illustrates one half of the insulation element 90 up to the axis of symmetry 14. The insulation element 90 comprises a substantially hollow cylindrical insulation shell 92 including insulation material and having a cylindrical outer surface 94 and a cylindrical inner surface 96. In the insulation material region of the insulation shell 92 accommodating the socket end, the inner surface 96 is provided with concentric incisions, slits or other recesses 98. The maximum width of the slits is 3 mm and even better 1.5 to 2 mm. The spacing of the slits in the axial direction depends on the outer contour of the socket end. In case of abrupt changes of the cross section they must be arranged more closely to each other and more deeply than in the case of gradual changes. By making incisions or slits, the mostly annular elements thus formed can react independently to the kind and extent of the deformation to finally produce a substantially form-fit interconnection with the object to be insulated. The flexibility of the insulation material of the insulation shell 92 is increased if necessary by pinching or kneading the section accommodating the socket end in the radial direction, preferably after making the slits, thus reducing the stiffness of the insulation material and increasing its flexibility there. The embodiment of the present invention illustrated in FIG. 3a offers the advantage that a great number of different socket ends can be accommodated in this insulation element 90, i.e. socket ends of a different size and different shape.

FIG. 3b is a longitudinal sectional view of an insulation element 100 according to the present invention, which again comprises a hollow cylindrical inner insulation shell 102 and a hollow cylindrical outer protective shell 104 surrounding the insulation shell 102. The insulation shell 102 can be connected to the outer protective shell 104 for example by means of an adhesive. This, however, is not shown in further detail in FIG. 3b. The insulation shell 102 and the outer protective shell 104 each have a rotationally symmetrical structure, for which reason and for reasons of simplicity FIG. 3b merely illustrates one half of the insulation element 100 up to the axis of symmetry 14.

The embodiment shown in FIG. 3b is characterized by the insulation shell 102 comprising juxtaposed insulation disks 106 of a uniform diameter in the part accommodating the socket end. The fibers of these insulation disks 106 can be arranged radiantly or overwhelmingly concentrically. The arrangement of insulation disks 106 in the insulation material part of the insulation shell 102 accommodating the socket end also increases the flexibility, resulting in that the socket end is received in the insulation shell 102 in a form-fit fashion. If necessary the insulation disks can be pre-squeezed or pre-kneaded, thus further increasing the flexibility of the insulation material section accommodating the socket end.

FIG. 4a shows a cross sectional view of an insulation element according to the invention. This insulation element may be one according to the embodiments illustrated in the FIGS. 1 to 3. Irrespective of the fact whether the insulation element only comprises an insulation shell or additionally also an outer protective shell, the wall of the hollow cylindrical insulation element is completely cut through along one longitudinal side, as indicated by cut 108, and is partially incised in a part of the insulation element substantially opposite to the incision 108, as indicated by cut 110. Due to the cuts 108 and 110 the insulation element is easy to open for arranging a socket pipe in the insulation element.

FIG. 4b shows a cross sectional view of an alternative insulation element which again may be an insulation element according to the embodiments illustrated in the FIGS. 1 to 3. The insulation element shown in FIG. 4b substantially corresponds to the insulation element shown in FIG. 4a. In addition to the cuts 108 and 110 further radial incisions 112 are provided in the longitudinal direction of the insulation element, thus making it easier to open the insulation element.

FIG. 5a shows a longitudinal sectional view of a further embodiment of an insulation element 120 according to the present invention having a rotationally symmetrical structure, for which reason and for reasons of simplicity only one half up to the axis of symmetry 14 is shown. The insulation element 120 comprises a hollow cylindrical insulation shell 122 including an insulation material and intended to accommodate a socket pipe. In the part of the insulation shell 122 which accommodates the socket end the insulation shell 122 is composed of individual insulation disks 124 which are axially juxtaposed and adhered to each other, for example by using a suitable adhesive. The inner diameters of the insulation disks 124 are at least partially different from each other, thus approximating the outer contour to the socket end to be accommodated. Further the individual insulation disks 124 can have different bulk densities and different binders and binder contents to thus adjust the elasticity of the individual insulation disks 124. Additionally, individual or all insulation disks 124 can be pre-pinched or pre-kneaded to reduce the stiffness of the insulation material to a desired extent. To achieve a safe connection to the free end of a socket pipe, at least the final insulation disk 124 has an inner diameter on the free end of the insulation shell 122 substantially corresponding to the outer diameter of the socket pipe. Further also the insulation element 120 can have incisions in the longitudinal direction, as shown in the FIGS. 4a and 4b.

FIG. 5b shows a longitudinal sectional view of an embodiment of an insulation element 130 according to the present invention having a two-part structure in the part accommodating the pipe of a socket pipe, namely having a hollow cylindrical inner insulation shell 132 including an insulation material and a hollow cylindrical outer protective shell 134 including an insulation material. The protective shell 134 surrounds the insulation shell 132 and can be fixed to it.

The insulation materials of the insulation shell 132 and of the outer protective shell 134 can be different from each and can thus be adapted to the corresponding application.

The socket end-receiving part of the insulation shell of the insulation element illustrated in FIG. 5b is again formed by axially juxtaposed insulation disks 136 which are fixed to each other and which have different inner diameters and thus are at least partially adapted to the outer contour of the socket end to be received. The individual insulation disks 136 can have different bulk densities, binders and binder contents to adjust the rigidity of the individual insulation disk 136. If necessary, the individual insulation disks 136 can be pre-kneaded. To achieve a safe connection to the free end of a socket pipe, here too the at least final insulation disk 136 an inner diameter on the free end of the insulation element which corresponds to the outer diameter of the socket end.

FIG. 6 shows a sectional view of a closure and sealing device 140 using the example of an opening in a ceiling. As shown in FIG. 6, an insulation element 50 according to the invention as shown in FIG. 2a having a socket pipe 142 inserted therein is passed through a cylindrical opening 144 of a ceiling 146 in such a way, that it upwardly protrudes for some distance from the ceiling 146. The insulation element 150 has already been described in detail in conjunction with FIG. 2a, for which reason it will not be explained any further in the following. The free end of the socket pipe 142 has inserted therein a sewer pipe 148 that is sealed along the outer circumference thereof by means of a ring seal 150 provided in the socket end of the socket pipe 142. Around the outer circumference of the part of the insulation element 50 protruding from the ceiling 146 individual molded pieces 152 are arranged and are glued together and are affixed to the ceiling 146. Together these molded pieces 152 form a molded part 154 having a rectangular outer circumference and a substantially centrally arranged round passage opening through which the part of the insulation element 50 protruding from the ceiling 146 is passed. The individual molded pieces 152 can be made of concrete, porous concrete, sintered glass, foamed glass or the like. If necessary they can be provided with an adhesion enhancing layer for affixing tiles or for applying a paint coat. The molded part 154 produced substantially serves to protect the protruding part of the insulation element 50 against external damages or against the ingress of or wetting by cleaning water. The intermediate space between the molded part 154 and the adjacent walls of the room can be filled up with mortar if necessary. If the lower corners of the molded part 154 or of the individual molded pieces 152 are chamfered, additional sealant can be introduced into between the ceiling 146 and the molded part 154 which, however, is not shown in FIG. 6. The free end of the insulation element 50 and the free end of the socket pipe 142 accommodated therein are closed towards the top by an insulation disk 156 that can be opened and by rigid molded parts 158. The insulation disk can be made for example from mineral wool. The rigid molded parts 158 can advantageously be impregnated so that they are easy to spread.

FIG. 7 shows a sectional view of a further closure and sealing device 160 according to the present invention, using the example of a wall passage opening or through-penetration. As shown in FIG. 7, an insulation element 50 having a socket pipe 142 inserted therein is passed through a cylindrical opening 144 of a ceiling 146, which opening is provided with a refractory lining 162, in such a manner that it terminates some distance before the exit from the ceiling 146. The insulation element 50 has already been described in detail above, for which reason it will not be further explained in the following. The refractory layer 142 can be a mortar layer for example. Through this refractory layer 162 the reveal of the cylindrical opening 144 becomes very uniform, so that the insulation element 50 together with the socket pipe 142 accommodated therein can be installed in a simple and easy way. The free end of the socket pipe 142 has inserted therein a sewer pipe 148 which is sealed along its outer circumference through a ring seal 150 provided in the socket end of the socket pipe 142. The free end of the insulation element 50 and the free end of the socket pipe 142 received therein are closed towards the top by an insulation disk 156 that can be opened and by rigid molded parts 158, the upwardly facing surfaces of the rigid molded parts 158 being arranged on the same level with the surface of the ceiling 146. The insulation disk 156 can be made for example from mineral wool. The rigid molded parts can advantageously be impregnated so as to be easy to spread, to prevent the ingress of humidity in the direction of the insulation element.

It will be understood that the above-described embodiments are by no means limiting. Modifications and changes are possible without departing from the scope of the present invention which is defined by the attached claims. Features of one embodiment can be supplemented or replaced by individual features of a different embodiment where deemed appropriate. Further it should be noted that the present invention not only relates to insulation materials for accommodating socket pipes as described in the embodiments, but can be generally applied to insulation elements for accommodating pipeline sections having an enlarged outer diameter, such as connection parts for the connection of pipes, valves, connectors or the like.

List of Reference Numbers 10 insulation element
12 socket pipe
14 axis of symmetry
16 insulation shell
18 outer surface
20 inner surface
22 socket end
24 protective layer
26 broken line
28 molded piece
30 insulation element
32 insulation shell
34 outer surface
36 inner surface
38 outer protective shell
40 adhesive connections
42 protruding part
50 insulation element
52 insulation shell
54 outer protective shell
56 free end
58 free end
60 free end
62 free end
64 protective layer
70 insulation element
72 insulation shell
74 outer protective shell
76 free end
78 free end
80 free end
82 free end
84 impregnation
90 insulation element 92 insulation shell
94 outer surface
96 inner surface
98 recesses
100 insulation element
102 insulation shell
104 outer protective shell
106 insulation disks
108 cut
110 cut
112 cut
120 insulation element
122 insulation shell
124 insulation disks
130 insulation element
132 insulation shell
134 outer protective shell
136 insulation disks
140 closure and sealing device
142 socket pipe
144 opening (through-penetration)
146 ceiling
148 sewer pipe
150 ring seal
152 molded pieces
154 molded part
156 insulation disc
158 rigid molded parts
160 closure and sealing device
162 refractory layer

The invention claimed is:

1. A wall passage opening device for an arrangement in a through-penetration of a building wall having at least one reveal comprising:
an insulation element;
a conduit including a first section having a first outer diameter and at least a second section, wherein the second section has an enlarged outer diameter compared to the outer diameter of the first section;
a refractory layer lining the reveal of said building wall;
said insulation element including an insulation shell housing at least a portion of said conduit;
said insulation shell extending entirely through said through-penetration of said building wall;
said insulation shell is made of mineral fibres;
said insulation shell defining a cavity receiving at least a portion of both the first outer diameter section and the second outer diameter section of said conduit;
said insulation shell including an insulation material region defining at least a portion of the cavity receiving at least the second outer diameter section; and said insulation material region having an interior surface substantially corresponding to an outer surface of the second outer diameter section of said conduit; wherein said inner surface of said insulation material region sealingly compresses against said outer surface of said second outer diameter section of said conduit.

2. The wall passage opening device of claim 1 further comprises the insulation element having an outer diameter that is slightly smaller than the diameter of the through-penetration of said building wall.

3. The wall passage opening device of claim 1 wherein the insulation element sealingly receives the conduit.

4. The wall passage opening device of claim 1 further comprises an insulation disk covering a front face of said conduit and covering a front face of at least one free end of said insulation element.

5. A wall passage opening device for an arrangement in a through-penetration of a building wall having at least one reveal comprising:
an insulation element;
a conduit including a first section having a first outer diameter and at least a second section, wherein the second section has an enlarged outer diameter compared to the outer diameter of the first section;
said insulation element including an insulation shell housing at least a portion of said conduit;
said insulation shell extending entirely through said through-penetration of said building wall;
said insulation shell is made of mineral fibres;
said insulation shell defining a cavity receiving at least a portion of both the first outer diameter section and the second outer diameter section of said conduit;
said insulation shell including an insulation material region defining at least a portion of the cavity receiving at least the second outer diameter section; and said insulation material region having an interior surface substantially corresponding to an outer surface of the second outer diameter section of said conduit; wherein said inner surface of said insulation material region sealingly compresses against said outer surface of said second outer diameter section of said conduit;
and wherein an outer periphery of said insulation shell is surrounded by at least one of a single-layered protective layer or a multi-layered protective layer.

6. The wall passage opening device of claim 5 further comprises the insulation element having an outer diameter that is slightly smaller than the diameter of the through-penetration of said building wall.

7. The wall passage opening device of claim 5 wherein the insulation element sealingly receives the conduit.

8. The wall passage opening device of claim 5 further comprises an insulation disk covering a front face of said conduit and covering a front face of at least one free end of said insulation element.

9. A wall passage opening device for an arrangement in a through-penetration of a building wall having at least one reveal comprising:
an insulation element;
a conduit including a first section having a first outer diameter and at least a second section, wherein the second section has an enlarged outer diameter compared to the outer diameter of the first section;
said insulation element including an insulation shell housing at least a portion of said conduit;
said insulation shell extending entirely through said through-penetration of said building wall;
said insulation shell is made of mineral fibres;
said insulation shell defining a cavity receiving at least a portion of both the first outer diameter section and the second outer diameter section of said conduit;
said insulation shell including an insulation material region defining at least a portion of the cavity receiving at least the second outer diameter section; wherein the insulation shell further comprises an outer protective shell defining a cavity, said outer protective shell including an insulation material made of mineral fibers; said insulation material region having an interior surface substantially corresponding to an outer surface of the second outer diameter section of said conduit; and wherein said inner surface of said insulation material region sealingly compresses against said outer surface of said second outer diameter section of said conduit.

10. The wall passage opening device of claim 9 further comprises the insulation element having an outer diameter that is slightly smaller than the diameter of the through-penetration of said building wall.

11. The wall passage opening device of claim 9 wherein the insulation element sealingly receives the conduit.

12. The wall passage opening device of claim 9 further comprises an insulation disk covering a front face of said conduit and covering a front face of at least one free end of said insulation element.

13. The wall passage opening device of claim 9 wherein the outer periphery of said outer protective shell is encased by a protective layer.

14. The wall passage opening device of claim 13 wherein the insulation material of the outer protective shell includes a greater amount of contents of inorganic binders than the insulation shell receiving the conduit section.

15. The wall passage opening device of claim 14 wherein an inner surface of the outer protective shell is fixed to an outer surface of the insulation shell.

16. The wall passage opening device of claim 9 wherein one of the insulation shell and the outer protective shell coaxially extends beyond the other one of the insulation shell and the outer protective shell.

17. The wall passage opening device of claim 9, wherein said mineral fibers are oriented substantially in the radial direction of said insulation element.

18. A wall passage opening device for an arrangement in a through-penetration of a building wall having at least one reveal comprising:
    a conduit including:
        a first section including a first outer diameter; and
        a second section including a second outer diameter that is greater than the first outer diameter;
    an insulation element including an insulation shell housing at least a portion of the conduit;
    the insulation shell extending entirely through the through-penetration of the building wall;
    the insulation shell is made of mineral fibres;
    a cavity defined by the insulation shell, the cavity receiving at least a portion of both the first outer diameter and the second outer diameter; and
    an insulation material region included with the insulation shell, the insulation material region defining at least a portion of the cavity receiving at least the second outer diameter, the insulation material region having an inner surface substantially corresponding to an outer surface of the second outer diameter;
    wherein the inner surface of the insulation material region sealingly compresses against the outer surface of the second outer diameter of the conduit, and
    wherein an outer periphery of the insulation shell is surrounded by a multi-layer protective layer.

19. The wall passage opening device of claim 18 wherein the insulation element sealingly receives the conduit.

* * * * *